US012602058B2

(12) United States Patent
Yoneda et al.

(10) Patent No.: US 12,602,058 B2
(45) **Date of Patent: \*Apr. 14, 2026**

(54) INFORMATION PROCESSING METHOD AND INFORMATION PROCESSING SYSTEM

(71) Applicant: Panasonic Intellectual Property Corporation of America, Torrance, CA (US)

(72) Inventors: Takahiro Yoneda, Osaka (JP); Toshiya Arai, Osaka (JP); Yuta Shimotsuma, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 212 days.

This patent is subject to a terminal disclaimer.

(21) Appl. No.: 18/396,064

(22) Filed: Dec. 26, 2023

(65) Prior Publication Data

US 2024/0126292 A1      Apr. 18, 2024

Related U.S. Application Data

(63) Continuation of application No. 16/849,495, filed on Apr. 15, 2020, now Pat. No. 11,892,856, which is a
(Continued)

(30) Foreign Application Priority Data

Oct. 5, 2018      (JP) ................................. 2018-189875

(51) Int. Cl.
*G05D 1/247*      (2024.01)
*G05D 1/228*      (2024.01)
(Continued)

(52) U.S. Cl.
CPC ............. *G05D 1/247* (2024.01); *G05D 1/228* (2024.01); *G07C 5/008* (2013.01); *G07C 5/085* (2013.01)

(58) Field of Classification Search
CPC ...... G05D 1/247; G05D 1/228; G05D 1/0027; G05D 1/0038; G07C 5/008; G07C 5/085;
(Continued)

(56) References Cited

U.S. PATENT DOCUMENTS 10,540,892 B1      1/2020  Fields et al.
10,630,723 B1      4/2020  Prasad et al.
(Continued)

FOREIGN PATENT DOCUMENTS

JP      2017-147626      8/2017
JP      2020-060841      4/2020
WO      2018/102477      6/2018

OTHER PUBLICATIONS

International Search Report (ISR) issued on Oct. 1, 2019 in International (PCT) Application No. PCT/JP2019/027121.
(Continued)

*Primary Examiner* — Donald J Wallace
(74) *Attorney, Agent, or Firm* — Wenderoth, Lind & Ponack, L.L.P.

(57)      ABSTRACT

An information processing method uses a computer and includes: obtaining a first information item regarding first monitoring performed by a first monitor on a first vehicle, the first monitoring being allocated to the first monitor; obtaining a second information item regarding second monitoring on a second vehicle, the second monitoring being not allocated to any monitor; comparing the first information item with the second information item; generating presentation information indicating the second monitoring on the second vehicle in accordance with a result of the comparing;
(Continued)

and presenting the generated presentation information via a presentation device.

18 Claims, 7 Drawing Sheets

Related U.S. Application Data continuation of application No. PCT/JP2019/027121, filed on Jul. 9, 2019.

(51) Int. Cl.
G07C 5/00 (2006.01)
G07C 5/08 (2006.01)

(58) Field of Classification Search
CPC .... G06Q 10/0637; G06Q 50/40; G08G 1/127; G08G 1/205
See application file for complete search history.

(56) References Cited

U.S. PATENT DOCUMENTS

| | | | |
|---|---|---|---|
| 11,388,553 B2 | 7/2022 | Arai et al. | |
| 11,892,856 B2 * | 2/2024 | Yoneda | G05D 1/0027 |
| 2015/0248131 A1 | 9/2015 | Fairfield et al. | |
| 2017/0228410 A1 | 8/2017 | Slusar | |
| 2018/0136651 A1 | 5/2018 | Levinson et al. | |
| 2018/0143635 A1 | 5/2018 | Zijderveld et al. | |
| 2019/0187691 A1 | 6/2019 | Magzimof et al. | |
| 2019/0270408 A1 | 9/2019 | Castro et al. | |
| 2020/0241559 A1 | 7/2020 | Yoneda et al. | |
| 2020/0293065 A1 | 9/2020 | Pedersen et al. | |

OTHER PUBLICATIONS

Extended European Search Report issued Oct. 21, 2021 in corresponding European Patent Application No. 19869529.8.

* cited by examiner

| Monitor ID | Task ID | Vehicle ID | Position information | Start time | End time | Working start time |
|------------|---------|------------|---------------------|------------|----------|--------------------|
| A | X | M1 | P1 | 19:00 | - | 17:00 |
| B | Y | M2 | P2 | 20:00 | - | 17:00 |
| ... | ... | ... | ... | ... | ... | ... |

| Task ID | Priority |
|---------|----------|
| X | 50 |
| Y | 90 |
| Z | 70 |
| ... | ... |

| Monitor ID | Proficiency [%] | | |
|------------|-----------------|--------|--------|
| | Task X | Task Y | Task Z |
| A | 100 | 20 | 10 |
| B | 20 | 50 | 80 |
| ... | ... | ... | ... |

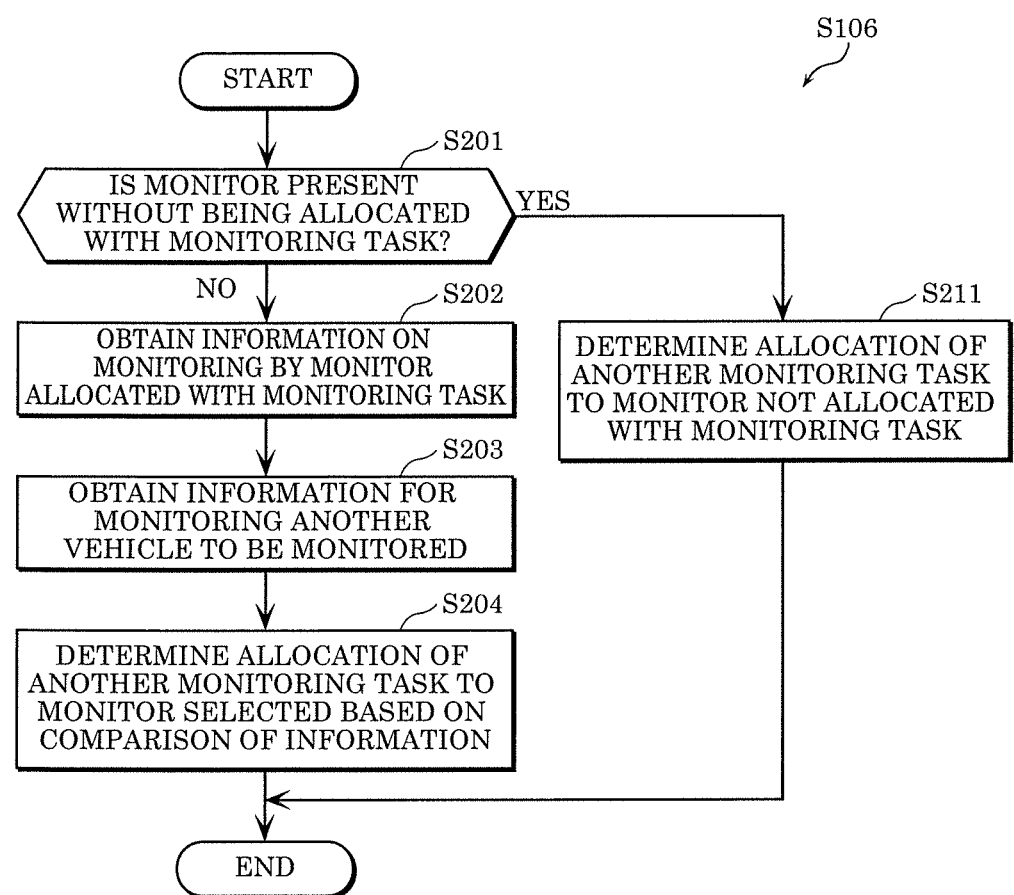

S106

START

S201
IS MONITOR PRESENT
WITHOUT BEING ALLOCATED
WITH MONITORING TASK?

YES

NO

S202
OBTAIN INFORMATION ON
MONITORING BY MONITOR
ALLOCATED WITH MONITORING TASK

S211
DETERMINE ALLOCATION OF
ANOTHER MONITORING TASK
TO MONITOR NOT ALLOCATED
WITH MONITORING TASK

S203
OBTAIN INFORMATION FOR
MONITORING ANOTHER
VEHICLE TO BE MONITORED

S204
DETERMINE ALLOCATION OF
ANOTHER MONITORING TASK TO
MONITOR SELECTED BASED ON
COMPARISON OF INFORMATION

END

FIG. 9

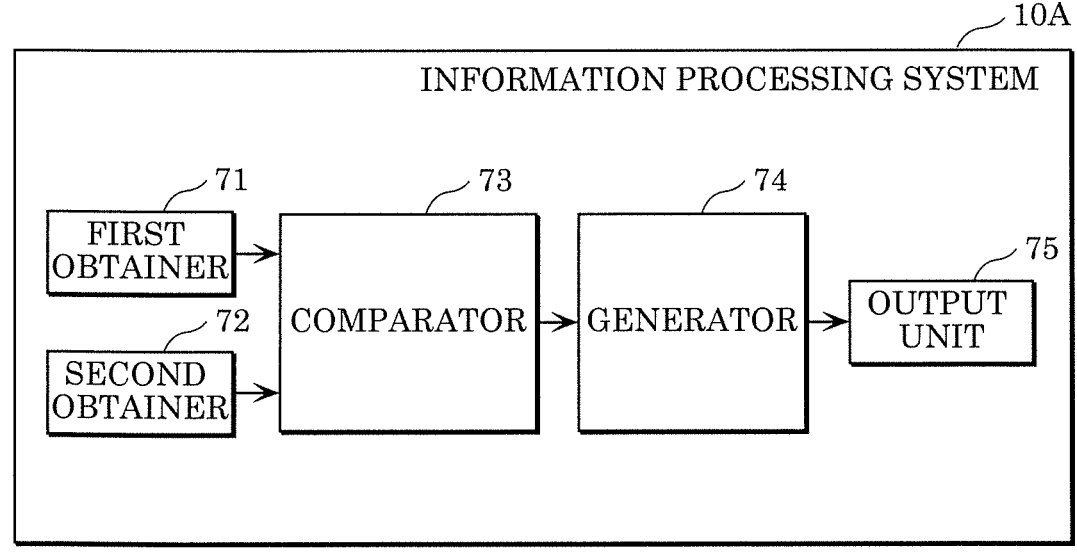

10A

INFORMATION PROCESSING SYSTEM

71
FIRST
OBTAINER

72
SECOND
OBTAINER

73
COMPARATOR

74
GENERATOR

75
OUTPUT
UNIT

INFORMATION PROCESSING METHOD AND INFORMATION PROCESSING SYSTEM

CROSS REFERENCE TO RELATED APPLICATIONS

This application is a U.S. continuation application of PCT International Patent Application Number PCT/JP2019/027121 filed on Jul. 9, 2019, claiming the benefit of priority of Japanese Patent Application Number 2018-189875 filed on Oct. 5, 2018, the entire contents of which are hereby incorporated by reference.

BACKGROUND

1. Technical Field

The present disclosure relates to information processing methods and information processing systems.

2. Description of the Related Art

There have been remote control systems in which an operator at a remote place indirectly controls, through wireless communications such as a wireless Local Area Network (LAN) or a portable telephone network, a vehicle that can autonomously move without a driver or driver's driving.

In such a remote control system, various sensors including a millimetric wave radar, a laser radar, a camera, etc. mounted in a vehicle observe the environments of the vehicle to generate sensing results. The sensing results are transmitted from the vehicle (hereinafter, referred to also as a target vehicle) to an operator via a communication means. The operator learns the state and environments of the vehicle from the sensing results, thereby determining how to control the vehicle and examining a method for the control. Then, the operator issues control signals regarding vehicle's operations to the vehicle so as to control the vehicle from a remote place.

For example, Japanese Unexamined Patent Application Publication No. 2017-147626 (hereinafter, referred to as PTL 1) discloses a technique of determining a remote controller to execute remote control on a vehicle entering a predetermined area, and performing the remote control.

SUMMARY

In the conventional technique like PTL 1, before an operator controls a vehicle, the operator or a monitor who is different from the operator and does not perform the operation (hereinafter, both an operator and a monitor may be referred to as monitors) monitors the vehicle. Hereinafter, a vehicle to be monitored is referred to as a target vehicle. As a monitor cannot forecast when and where dangerous situations such as an accident will happen, the monitor needs to watch scenes as much as possible, which is a heavy burden on the monitor. Therefore, the reduction of burdens on monitors is required. PTL1, however, discloses an invention for reducing burdens on operators performing remote control on vehicles, not a method of reducing burdens on monitors remotely monitoring vehicles.

In order to address the above problem, the present disclosure provides an information processing method to reduce monitoring burdens on monitors.

An information processing method in accordance with an aspect of the present disclosure uses a computer and includes: obtaining a first information item (hereinafter, information item will also be referred to simply as information) regarding first monitoring performed by a first monitor on a first vehicle, the first monitoring being allocated to the first monitor; obtaining a second information item regarding second monitoring on a second vehicle, the second monitoring being not allocated to any monitor; comparing the first information item with the second information item; generating presentation information indicating the second monitoring on the second vehicle in accordance with a result of the comparing; and presenting the generated presentation information via a presentation device.

General or specific aspects of the present disclosure may be implemented to a system, an integrated circuit, a computer program, a computer-readable recording medium such as a Compact Disc-Read Only Memory (CD-ROM), or any given combination thereof.

The information processing method according to the present disclosure can reduce monitoring burdens on monitors.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4 is an explanatory diagram of a monitor table managed by a task manager according to the embodiment.

FIG. 5 is an explanatory diagram of a task table managed by the task manager according to the embodiment.

FIG. 6 is an explanatory diagram of a proficiency table managed by the task manager according to the embodiment.

FIG. 8 is a flowchart depicting how a monitoring controller determines a monitor according to the embodiment.

FIG. 9 is a block diagram illustrating a configuration of an information processing system according to a variation of the embodiment.

DETAILED DESCRIPTION OF THE EMBODIMENT

Figure 1:
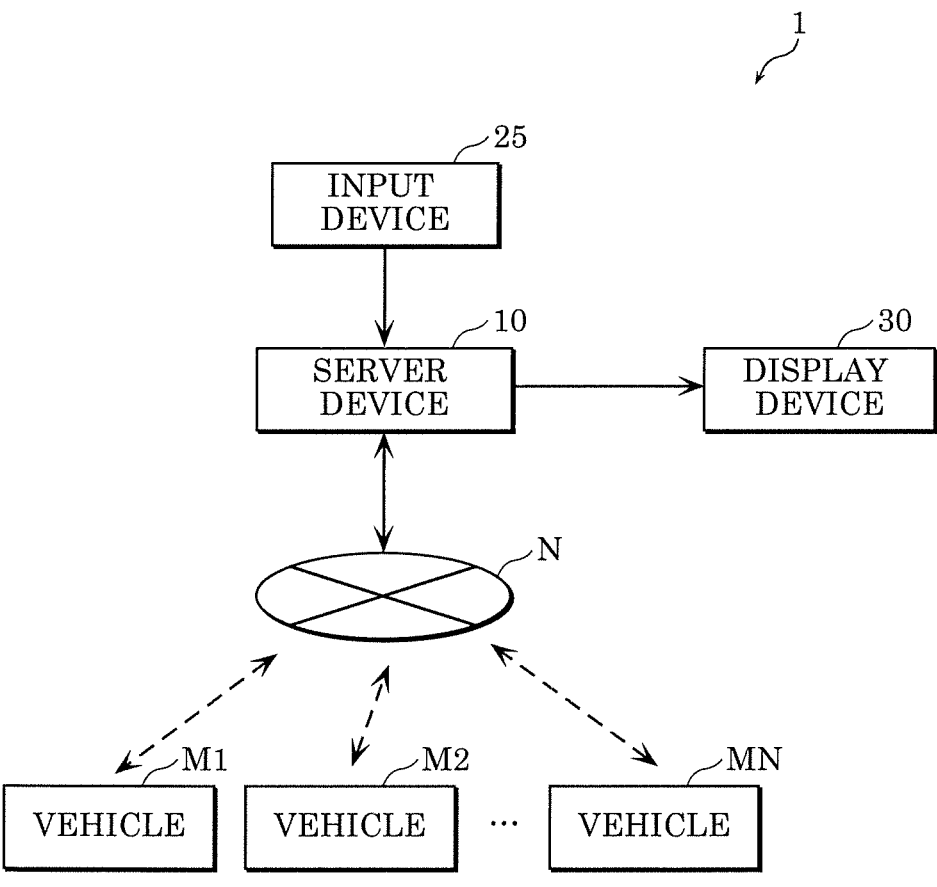
FIG. 1 is a block diagram illustrating a configuration of a monitoring system according to an embodiment of the present disclosure.

An information processing method in accordance with an aspect of the present disclosure uses a computer and includes: obtaining a first information item regarding first monitoring performed by a first monitor on a first vehicle, the first monitoring being allocated to the first monitor; obtaining a second information item regarding second monitoring on a second vehicle, the second monitoring being not allocated to any monitor; comparing the first information item with the second information item; generating presentation information indicating the second monitoring on the second vehicle in accordance with a result of the comparing; and presenting the generated presentation information via a presentation device.

According to the above, the presentation information regarding monitoring on the second vehicle to be monitored is generated in accordance with a result of comparing the first information item with the second information item. Therefore, it is possible to present the information regarding monitoring on the second vehicle in consideration with a relationship between the monitoring on the first vehicle which has already been performed and the monitoring on the second vehicle. Therefore, a more appropriate monitor is selected to monitor the second vehicle in comparison with the case where at least one of the monitoring on the first vehicle and the monitoring on the second vehicle is not considered. As a result, a monitoring burden on the monitor can be reduced.

For example, the first information item includes an attribute of the first monitoring on the first vehicle, and the second information item includes an attribute of the second monitoring on the second vehicle.

According to the above, the monitoring on the second vehicle is determined based on a comparison between the attributes of the first and second vehicles. Therefore, it is easier to design the comparing processing for determining the monitoring on the second vehicle.

For example, the first information item includes a first priority of the first monitoring on the first vehicle, and the second information item includes a second priority of the second monitoring on the second vehicle.

According to the above, the monitoring on the second vehicle is determined based on a comparison between the priorities of the first and second vehicles. Therefore, it is possible to determine which is to be monitored first between the first vehicle and the second vehicle. Therefore, it is possible to allocate a monitor to a vehicle having a higher priority, and thereby reduce a monitoring burden on the monitor.

For example, the first priority includes at least one of (i) a priority of the first vehicle and (ii) a priority of a monitoring task for the first monitoring on the first vehicle, and the second priority includes at least one of (i) a priority of the second vehicle and (ii) a priority of a monitoring task for the second monitoring on the second vehicle.

According to the above, monitoring on the second vehicle is determined based on a comparison between the first and second vehicles regarding at least one of (i) priorities of the vehicles and (ii) priorities of monitoring tasks for their monitoring. Therefore, it is possible to enhance an accuracy of the determination which is to be monitored first between the first vehicle and the second vehicle.

For example, the first priority includes a priority based on at least one of (i) a first passenger of the first vehicle and (ii) whether or not the first passenger is to be considered, and the second priority includes a priority based on at least one of (i) a second passenger of the second vehicle and (ii) whether or not the second passenger is to be considered.

According to the above, monitoring on the second vehicle is determined based on a comparison between the first and second vehicles regarding at least one of (i) passengers of the vehicles and (ii) whether or not the passengers are to be considered. Therefore, it is possible to enhance an accuracy of the determination which is to be monitored first between the first vehicle and the second vehicle.

For example, the information processing method further includes: obtaining first vehicle information on the first vehicle and second vehicle information on the second vehicle; and calculating the first priority based on the first vehicle information and calculating the second priority based on the second vehicle information.

According to the above, monitoring on the second vehicle is determined based on a comparison between vehicle information items each including a vehicle position and a vehicle speed. Therefore, it is possible to enhance an accuracy of the determination which is to be monitored first between the first vehicle and the second vehicle.

For example, the comparing includes comparing a similarity between (i) each of a plurality of first information items each being the first information item regarding a plurality of first vehicles each being the first vehicle monitored by a plurality of monitors and (ii) the second information item, the information processing method comprises: selecting, from among the plurality of monitors, a second monitor to be allocated with the second monitoring on the second vehicle in accordance with the result of the comparing; and presenting the presentation information to the second monitor selected in the selecting.

According to the above, when a plurality of monitors are currently monitoring a plurality of vehicles, in other words, when there are a plurality of the first vehicles, it is possible to appropriately select a monitor to monitor the second vehicle from the monitors in accordance with similarities between monitoring on the first vehicles and monitoring on the second vehicle. A monitor has a less burden in monitoring a vehicle that is more similar to a previously monitored vehicle. Therefore, it is possible to determine an appropriate vehicle to be monitored and also reduce a burden in monitoring the vehicle.

For example, each of the first information items includes first position information included in the first vehicle information on a corresponding one of the plurality of first vehicles, the second information includes second position information included in the second vehicle information on the second vehicle, and the similarity includes a distance between (i) a position indicated in the first position information of each of the plurality of first vehicles and (ii) a position indicated in the second position information of the second vehicle.

According to the above, monitoring on the second vehicle is determined based on how much the positions of the first and second vehicles are close to each other. As the second vehicle is closer to the first vehicle, the second vehicle has a monitoring task more similar to that of the first vehicle. Therefore, a monitor has a less change in monitoring the second vehicle after monitoring the first vehicle. As a result, it is possible to reduce a burden on the monitor monitoring the second vehicle after the first vehicle.

For example, each of the first information items includes at least one of a content and a difficulty of the first monitoring regarding a corresponding one of the plurality of first vehicles, the second information item includes at least one of a content and a difficulty of the second monitoring regarding the second vehicle, and the similarity includes a difference between (i) at least one of the content and the difficulty of the first monitoring regarding each of the plurality of first vehicles and (ii) at least one of the content and the difficulty of the second monitoring regarding the second vehicle.

According to the above, monitoring on the second vehicle is determined in accordance with at least one of a content and a difficulty of monitoring. As the second vehicle has a more similar content or difficulty to that of the first vehicle, the monitor has a less change in monitoring the second vehicle after monitoring the first vehicle. Therefore, it is possible to reduce a burden on the monitor.

For example, the information processing method further includes: obtaining state information items each indicating a state of a corresponding one of a plurality of monitors; selecting, from among the plurality of monitors, a third monitor to be allocated with the second monitoring on the second vehicle in accordance with the result of the comparing and the obtained state information items; and presenting the presentation information and the third monitor selected in the selecting.

According to the above, monitoring on the second vehicle is determined in accordance with a state of the monitor currently monitoring the first vehicle. Therefore, it is possible to allocate the second vehicle to a monitor having a less burden in monitoring the second vehicle after the first vehicle. As a result, the monitoring burden on the monitor can be efficiently reduced.

For example, the information processing method further includes: obtaining a state information item indicating a state of the first monitor; and generating the presentation information that recommends changing the first monitor to a monitor different from the first monitor in accordance with the result of the comparing and the state information item obtained in the obtaining.

According to the above, changing monitors are recommended based on a state of a monitor monitoring the first vehicle. Therefore, if a monitor is in a state inappropriate for monitoring, the monitor can be changed to a different monitor. As a result, it is possible to decrease a risk of inadequate or inappropriate monitoring resulting from a monitor's state.

For example, the state information item includes an information item indicating at least one of: a fatigue level; a health condition; attentiveness to a monitoring task for monitoring; an allocation state of the monitoring task; and a proficiency in the monitoring task.

According to the above, it is possible to more easily or more appropriately detect a state of a monitor monitoring a vehicle, based on a fatigue level, a health condition, attentiveness to a monitoring task, an allocation state of the monitoring task, and a proficiency in the monitoring task of the monitor.

For example, the proficiency includes a proficiency required for a task for the second monitoring on the second vehicle.

According to the above, it is possible to determine a monitor having a skill and experience suitable for monitoring on the second vehicle not for general vehicle monitoring, based on a proficiency required for a task for the monitoring on the second vehicle.

For example, the information processing method further includes: attempting to select, from a plurality of monitors, a fourth monitor to be recommended for the second monitoring on the second vehicle in accordance with the result of the comparing; and when there is no the fourth monitor to be selected in accordance with the result of the comparing, changing a state of the second vehicle in the comparing to a safer state via a controller controlling the second vehicle.

According to the above, it is possible to change a state of the second vehicle to a safer state when no monitor is selected to monitor the second vehicle. Therefore, it is possible to ensure safety of the second vehicle without increasing a burden on a monitor.

For example, the information processing method further includes: attempting to select, from a plurality of monitors, a fourth monitor to be recommended for the second monitoring on the second vehicle in accordance with the result of the comparing; obtaining estimated end times each indicating an estimated time of ending the first monitoring performed by a corresponding one of the plurality of monitors;

and when there is no the fourth monitor to be selected in accordance with the result of the comparing, selecting a monitor having an earliest estimated end time among the estimated end times as the fourth monitor from the plurality of monitors.

According to the above, when no monitor is selected to monitor the second vehicle, a monitor who is to end current monitoring earlier than any other monitors is allocated with the second vehicle. Therefore, a time period in which the second vehicle is not monitored can be decreased as much as possible, even if all monitors are currently busy in monitoring other vehicles and cannot immediately start monitoring the second vehicle.

For example, the information processing method further includes: obtaining an information item indicating a request time when the second monitoring on the second vehicle is to be requested; and presenting the presentation information before the request time.

According to the above, a request for monitoring is presented to a monitor before the monitoring is actually to be performed. Therefore, prior to a time of starting the monitoring, the monitor is able to learn that the monitor is selected to perform the monitoring. As a result, for example, the monitor has a time for preparation for the monitoring, thereby reducing a burden in starting the monitoring.

An information processing system in accordance with another aspect of the present disclosure includes: a first obtainer that obtains a first information item regarding first monitoring performed by a first monitor on a first vehicle, the first monitoring being allocated to the first monitor; a second obtainer that obtains a second information item regarding second monitoring on a second vehicle, the second monitoring being not allocated to any monitor; a comparator that compares the first information item with the second information item; a generator that generates presentation information indicating the second monitoring on the second vehicle in accordance with a result of the comparing by the comparator; and an output unit that presents the generated presentation information via a presentation device.

The information processing system has the same advantages as those of the above-described information processing method.

General or specific aspects of the present disclosure may be implemented to a system, an integrated circuit, a computer program, a computer-readable recording medium such as a Compact Disc-Read Only Memory (CD-ROM), or any given combination thereof.

Hereinafter, a certain exemplary embodiment will be described in detail with reference to the accompanying Drawings.

The following embodiment is a specific example of the present disclosure. The numerical values, shapes, materials, elements, arrangement and connection configuration of the elements, steps, the order of the steps, etc., described in the following embodiment are merely examples, and are not intended to limit the present disclosure. Among elements in the following embodiment, those not described in any one of the independent claims indicating the broadest concept of the present disclosure are described as optional elements.

Embodiment 1

The present embodiment will describe an information processing method capable of reducing a monitoring burden on a monitor.

A remote monitoring system (hereinafter, will be simply referred to as a monitoring system) obtains sensing results from a target vehicle via communication means and transmits the results to a monitor. The monitor learns the state of the target vehicle and a state around the vehicle from the transmitted sensing results and determines whether the intervention of an operator on the vehicle is necessary or not. The monitor may examine a proper intervention method, for example, an indirect operation method by an operator. If the monitor determines that the target vehicle is difficult to autonomously move, the monitor requests remote control from an operator. The operator issues control signals regarding vehicle's operations to the target vehicle (i.e., a vehicle to be operated) so as to control the vehicle from a remote place. If the operator is a monitor, the operator may directly proceed to an operation from monitoring.

Figure 2:
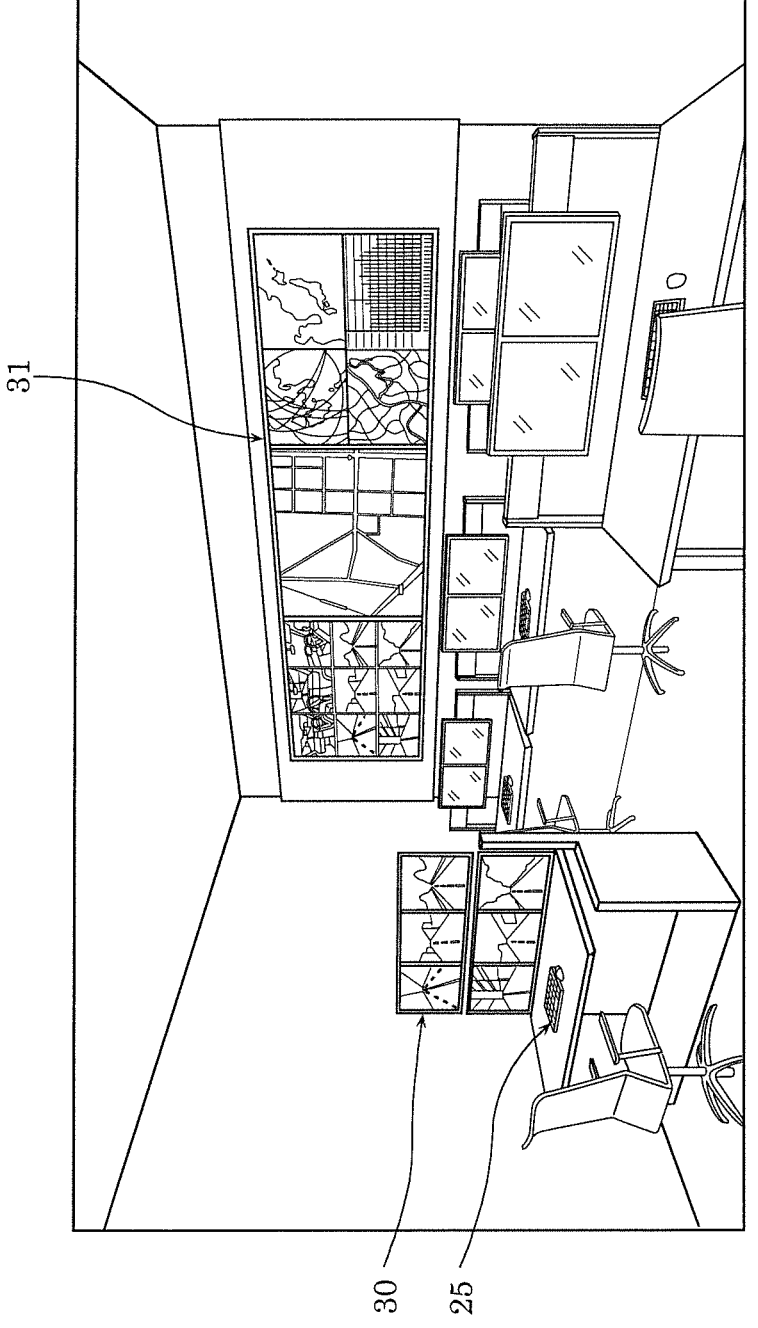
FIG. 2 is a schematic diagram illustrating an example of a monitoring room according to the embodiment.

FIG. 1 is a block diagram illustrating a configuration of monitoring system 1 according to the present embodiment. FIG. 2 is a schematic diagram illustrating an example of a monitoring room according to the present embodiment.

Monitoring system 1 in FIG. 1 is an information processing system for monitoring vehicles M1, M2, . . . , MN that may act as target vehicles. Hereinafter, vehicles M1, M2, . . . , MN will be also referred to as "vehicles M1 and the like." The monitoring room in FIG. 2 is a room for monitoring vehicles M1 and the like by the monitor. In the monitoring room, information obtained from vehicle M1 and the like and information for monitoring vehicles M1 and the like are presented to the monitor and an operation for monitoring can be performed by the monitor. In addition to the operation for monitoring by the monitor, an operation for remote control on the target vehicle may be performed. The monitor may be an operator who operates a target vehicle or another person.

As illustrated in FIG. 1, monitoring system 1 includes server device 10, input device 25, and display device 30.

Server device 10 is a processor that makes a determination on monitoring performed by the monitor. Specifically, server device 10 makes a determination on monitoring according to information processing by a computer, the information processing being performed using contents input to input device 25 and vehicle information obtained from vehicles M1 and the like. Server device 10 may be disposed at any physical location so as to be communicably connected to network N. For example, if server device 10 is disposed in or near the monitoring room, server device 10 can communicate with input device 25 and display device 30 in a short time.

Input device 25 is an input device where an operation by the monitor is input. Input device 25 may be, for example, a keyboard, a mouse, or a touch panel that is connected to server device 10 or a button operable by a press or a touch. Input device 25 provides server device 10 with information on the input operation. Input device 25 is installed in the monitoring room. If server device 10 is located at a remote place, input device 25 and server device 10 may be connected to each other via a network.

Display device 30 is a device for obtaining presentation information from server device 10 and presenting the presentation information as images. The images include photographs, illustrations, or characters. Display device 30 is, for example, a liquid crystal display. Images output from display device 30 are visually identified and are used when the monitor determines which of the vehicles is to be monitored or how to monitor the vehicles. Display device 30 is an example of a presentation device. Monitoring system 1 may include a sound output device as a presentation device along with or instead of display device 30. Display device 30 is installed in the monitoring room. If server device 10 is located at a remote place, display device 30 and server device 10 may be connected to each other via a network.

Vehicle M1 is a manned or unmanned vehicle, for example, a self-driving vehicle. Vehicle M1 is a vehicle to be monitored by the monitor. Vehicle M1 is present in an external space different from the monitoring room, for example, a road or a parking lot.

Vehicle M1 includes a communication interface, is connected to network N via communications, and is communicably connected to server device 10 via network N. Vehicle M1 includes at least one camera that captures an image around vehicle M1 and a plurality of sensors that detect, for example, the position, speed, acceleration, and steering angle of vehicle M1, the amount of remaining fuel, the operating state of a direction indicator, the operating state of an Anti-lock Braking System (ABS) or Automatic Emergency Braking (AEB), the number and kind of surrounding objects, and distances from the surrounding objects. Vehicle M1 transmits image data generated by capturing an image by the at least one camera and information including sensing data on positions and the like obtained by the sensors, to server device 10 via the communication interface and network N. The information transmitted by vehicle M1 will be also referred to as vehicle information. The acceleration and steering angle of vehicle M1 may be optionally controlled by the monitor via network N. Such control performed by the monitor is also referred to as remote control.

Vehicles M2 to MN are similar to vehicle M1 and move independently of vehicle M1. Furthermore, vehicles M2 to MN each transmit image data and sensing data, which are generated by the devices of the vehicles, to server device 10 like vehicle M1.

Network N is a communication network to which server device 10 and vehicles M1 and the like are connected. For example, the communication standard or communication system of network N is, but is not limited to, a mobile telephone network, a satellite communication network, or a wide area network using Wi-Fi. A part connected to vehicles M1 and the like is wirelessly connected.

Input device 25 and display device 30 are disposed in the monitoring room. Input device 25 and display device 30 are located so as to facilitate input and visual identification by the monitor. For example, input device 25 and display device 30 are disposed on a desk at the front of the chair of the monitor. Moreover, display device 31 for displaying the image data obtained by vehicles M1 and the like and images such as a map indicating the position of vehicle M1 is disposed so as to be viewed from the entire monitoring room.

A plurality of monitors may be present. The number of monitors is smaller than the number of vehicles M1 and the like. It is assumed that the monitor does not always monitor all vehicles M1 and the like but selectively monitors only the vehicle determined to be monitored and does not monitor other vehicles. This can advantageously reduce a staff for monitoring and allows the monitor to intensively monitor the vehicle to be monitored. It is determined that monitoring is necessary, for example, at a position where caution is required for driving the vehicle, in a state where caution is necessary for driving the vehicle, near the position where the caution is required, or in a state where the caution is likely to be required.

The monitor visually identifies images presented by display device 30 and determines which of vehicles M1 and the like is to be monitored or how to monitor the vehicles.

Subsequently, the monitor inputs the vehicle to be monitored or a monitoring method to server device 10 via input device 25.

Hereinafter, processing for allowing server device 10 to additionally select the monitor who monitors the vehicle to be monitored will be described below. The monitor monitors the vehicle based on information presented by display device 30. If a proper monitoring target is presented by server device 10, the monitor can more properly monitor the vehicle. In this case, "more properly monitor the vehicle" means that the vehicle is monitored with higher efficiency, higher accuracy, and a proper feeling of tension or with less fatigue and a lighter burden.

Figure 3:
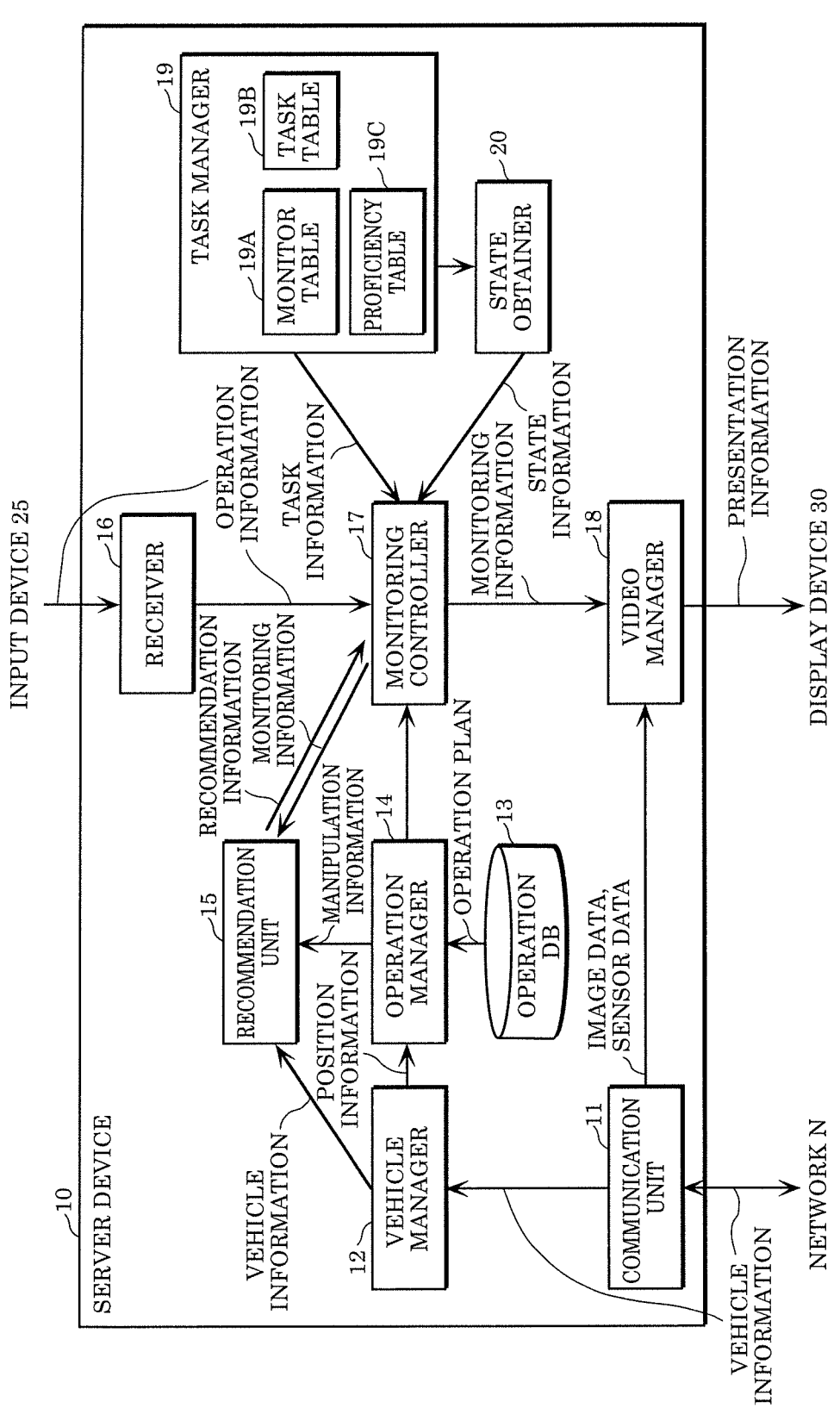
FIG. 3 is a block diagram illustrating a functional structure of a server device according to the embodiment.

FIG. 3 is a block diagram illustrating a functional structure of server device 10 according to the present embodiment.

As illustrated in FIG. 3, server device 10 includes communication unit 11, vehicle manager 12, operation database (DB) 13, operation manager 14, recommendation unit 15, receiver 16, monitoring controller 17, video manager 18, task manager 19, and state obtainer 20.

Communication unit 11 is a communication interface that is connected to network N and is communicably connected to vehicles M1 and the like via network N. Communication unit 11 obtains vehicle information from vehicle M1 and the like.

Vehicle manager 12 is a processor that manages vehicles M1 and the like. Vehicle manager 12 obtains the vehicle information transmitted from vehicles M1 and the like and manages the positions, speeds, and traveling states of vehicles M1 and the like based on the obtained vehicle information.

Operation DB 13 is a database that stores information for the operations of vehicles M1 and the like. Operation DB 13 stores information on maps and operation plans as information for the operations of vehicles M1 and the like. The operation plans include information on traveling routes scheduled for driving vehicles M1 and the like and information on scheduled positions on the routes of vehicles M1 and the like at points in time during traveling.

Operation manager 14 is a processor that manages the operations of vehicles M1 and the like. Operation manager 14 obtains information on the operation plans of vehicles M1 and the like from operation DB 13 and transmits instruction information including the traveling routes of vehicles M1 and the like to vehicles M1 and the like. Moreover, operation manager 14 determines operation information including to what extent the operations of vehicle M1 and the like delay from the operation plans.

Recommendation unit 15 is a processor that generates information for recommending the monitor the vehicle to be monitored by the monitor. Recommendation unit 15 obtains the vehicle information, which is transmitted from vehicles M1 and the like, from vehicle manager 12, obtains the operation information on the operations of vehicles M1 and the like from operation manager 14, and obtains monitoring information on monitoring targets, which are determined by the monitor based on the vehicle information and the operation information, from monitoring controller 17. Subsequently, based on the obtained vehicle information, operation information, and monitoring information, recommendation unit 15 determines the vehicle to be monitored by the monitor and generates recommendation information for recommending the monitor the vehicle as a monitoring target. The vehicle to be monitored by the monitor is determined by various methods. For example, the vehicle to be monitored is a vehicle in a state where caution is necessary for driving the vehicle, for example, a vehicle exceeding a legally permitted speed or a vehicle to which a sudden braking is applied or a vehicle at a position where caution is necessary for driving the vehicle, for example, in a lane restricted by a construction site or other factors. Furthermore, the vehicle to be monitored is not a target of monitoring at this point in time and is to be additionally monitored.

Receiver 16 is a processor that receives manipulation information on an input operation performed by the monitor on input device 25. The manipulation information includes, for example, an operation of switching targets to be monitored by the monitor.

Monitoring controller 17 is a processor that determines the vehicle to be monitored and the monitor who monitors the vehicle. Monitoring controller 17 determines the vehicle to be monitored, based on the recommendation information generated by recommendation unit 15 and the manipulation information received by receiver 16. Moreover, monitoring controller 17 determines the monitor who monitors the vehicle determined as a target of monitoring, based on task information obtained from task manager 19 and state information obtained from state obtainer 20. Monitoring controller 17 provides the generated monitoring information for video manager 18. Alternatively, monitoring controller 17 may include information for suggesting switching to another monitoring task to the monitor or information for automatically switching to another monitoring task.

Specifically, monitoring controller 17 makes the determination by comparing a first information item with a second information item. In this case, the vehicle to be monitored will be also referred to as a second vehicle and the vehicle monitored by the monitor will be also referred to as a first vehicle when the monitor who monitors the vehicle to be monitored is determined. In other words, the second vehicle is a vehicle on which monitoring is not allocated to any monitor.

Information on monitoring by the monitor allocated with monitoring on the first vehicle will be also referred to as the first information item and information on monitoring on the second vehicle will be also referred to as the second information item. The first information item corresponds to the task information obtained from task manager 19. The second information item includes information on monitoring on the vehicle to be monitored in the recommendation information generated by recommendation unit 15 and includes information on the monitoring in the recommendation information generated by recommendation unit 15 from among information included in task table 19B provided for task manager 19.

The first information item may include an attribute of monitoring on the first vehicle and the second information item includes an attribute of monitoring on the second vehicle.

More specifically, the first information item may include a first priority of monitoring on the first vehicle and the second information item may include a second priority of monitoring on the second vehicle. For example, if a comparison determines that the first priority is lower than the second priority, monitoring controller 17 can allocate another monitoring task to the monitor who monitors the vehicle of the first priority.

In this case, the monitoring task is a unit of processing performed by server device 10 in order to enable monitoring by the monitor. Specifically, the monitoring task is a monitoring task for monitoring a vehicle at a position or in a state where caution is necessary for driving the vehicle, a monitoring task for monitoring a vehicle delayed from an operation plan, a monitoring task for monitoring a vehicle with decreasing battery power, or a monitoring task for monitoring a vehicle issuing a signal indicating a state of emergency.

The first priority may include at least one of the priority of the first vehicle and the priority of a monitoring task for monitoring on the first vehicle. The second priority may include at least one of the priority of the second vehicle and the priority of a monitoring task for monitoring on the second vehicle.

The first priority may include a priority based on at least one of the passenger of the first vehicle and whether or not the passenger of the first vehicle is to be considered. The second priority may include a priority based on the passenger of the second vehicle and whether or not the passenger of the second vehicle is to be considered.

In this case, the priority may include at least one of the priority of the vehicle and the priority of a monitoring task for monitoring on the vehicle. Alternatively, the priority may include a priority based on the passenger of the vehicle and whether or not the passenger of the vehicle is to be treated.

The first information item may include position information included in first vehicle information on the first vehicle. The second information item may include position information included in first vehicle information on the second vehicle. In this case, a similarity includes a distance between a position indicated by the position information on the first vehicle and a position indicated by the position information on the second vehicle. The position information may use, for example, position information (position information 44 which will be described later) in monitor table 19A provided for task manager 19. For example, in the case of a distance of several hundred meters or several kilometers between the positions of the first vehicle and the second vehicle, it is determined that the first vehicle and the second vehicle are close to each other in the same or adjacent cities, towns, or villages.

The first information item may include at least one of the content and the difficulty of monitoring on the first vehicle and the second information item may include at least one of the content and the difficulty of monitoring on the second vehicle. In this case, the similarity includes the similarity of at least one of the content and the difficulty of monitoring on the first vehicle.

An example of the contents and the difficulty of monitoring will be described below. For example, the contents of monitoring with a relatively low difficulty include the confirmation of passengers who get on or off at stops or the like and the confirmation of a state of vehicles stuck due to the influence of a traffic jam or the like. Moreover, the contents of monitoring with a medium difficulty include, for example, a safety check resulting from an urgency stop of a vehicle, entry into an intersection where the amount of traffic of mobile objects including pedestrians and bicycles is small, passing a vehicle parked on a road having a relatively small blind spot, and pulling over to the side of a road by remote control on a vehicle. For example, the contents of monitoring with a relatively high difficulty include, for example, entry into an intersection where the amount of traffic of mobile objects including pedestrians and bicycles is large, driving on a road where the amount of traffic of mobile objects including pedestrians and bicycles is large, driving at a merging point of lanes, and driving by remote control on a vehicle (lane restricted by an accident or a construction).

Video manager 18 is a processor that manages video to be displayed on display device 30. Video manager 18 generates presentation information including image data on the video and outputs the information to display device 30, thereby presenting the video via display device 30. Video manager 18 obtains monitoring information from monitoring controller 17. If the monitoring information includes information indicating a vehicle to be monitored, image data received by communication unit 11 from the vehicle to be monitored is included in the presentation information. The presentation information specifically includes the information indicating the vehicle to be monitored as indicated in the monitoring information and information indicating the monitor who monitors the vehicle.

Task manager 19 is a processor that manages the task of monitoring a vehicle (also referred to as "monitoring task") by the monitor. Task manager 19 manages information on a monitoring task processed by the monitor in the past and a monitoring task being processed by the monitor. Furthermore, task manager 19 stores information on attributes such as the priority and contents of monitoring tasks. Task manager 19 also has similarity relation information on the similarities of multiple monitoring tasks.

Task manager 19 may obtain the first vehicle information on the first vehicle and the second vehicle information on the second vehicle and calculate the first priority and the second priority by using the obtained first vehicle information and second vehicle information.

State obtainer 20 is a processor that obtains a state information item indicating a state of the monitor. The state information item is a state information item indicating a state of the monitor allocated with the monitoring of a vehicle. Specifically, the state information item includes an information item indicating at least one of a fatigue level, a health condition, attentiveness to a monitoring task, an allocation state of the monitoring task, and a proficiency in the monitoring task. The fatigue level is, in other words, the degree of fatigue.

State obtainer 20 analyzes a motion of a face or a body and a change of the color or shape of a face by image analysis on, for example, an image of the face or body of the monitor captured by a camera, thereby obtaining a fatigue level, a health condition, or attentiveness to a monitoring task. Moreover, state obtainer 20 obtains an allocation state of the monitoring task of the monitor with reference to monitor table 19A stored in task manager 19. Furthermore, state obtainer 20 obtains a proficiency in the monitoring task of the monitor with reference to proficiency table 19C stored in task manager 19. State obtainer 20 provides the obtained state information for monitoring controller 17.

The proficiency in the task may include a proficiency required for a task for monitoring the second vehicle. The proficiency is a proficiency for each monitoring task.

The comparing by monitoring controller 17 may include comparing a similarity between first monitoring information on the first vehicles to be monitored by multiple monitors and second monitoring information not to be monitored. One of the monitors (corresponding to a second monitor) may be selected as a monitor to be allocated with a monitoring task on the second vehicle in accordance with the result of the comparing. In this case, video manager 18 presents the presentation information to the second monitor selected by monitoring controller 17.

Moreover, state information indicating a state of the monitor allocated with monitoring on the first vehicle (corresponding to a first monitor) may be obtained and one of the monitors (corresponding to a third monitor) may be selected as a monitor to be allocated with a monitoring task on the second vehicle in accordance with the result of the comparing and the obtained state information. In this case, video manager 18 presents the presentation information to the selected third monitor.

Monitor table 19A, task table 19B, and proficiency table 19C will be specifically described below as information stored in task manager 19.

FIG. 4 is an explanatory diagram of monitor table 19A managed by task manager 19 according to the present embodiment. Monitor table 19A is an example of information on a monitoring task processed by the monitor in the past and a monitoring task being processed by the monitor.

As indicated in FIG. 4, each entry of monitor table 19A includes the items of monitor ID 41, task ID 42, vehicle ID 43, position information 44, start time 45, end time 46, and working start time 47.

Monitor ID 41 is identification information on a monitor who processes the monitoring task of the entry.

Task ID 42 is identification information on the monitoring task of the entry.

Vehicle ID 43 is the identifier of a vehicle to be monitored in the monitoring task of the entry.

Position information 44 is position information on the position of a vehicle to be monitored in the monitoring task of the entry.

Start time 45 is the start time of monitoring in the monitoring task of the entry.

End time 46 is the end time of monitoring in the monitoring task of the entry. For a task being processed by the monitor, end time 46 is left blank. In other words, an entry with described end time 46 is a monitoring task processed by the monitor in the past, whereas an entry with blank end time 46 is a monitoring task being processed by the monitor.

Working start time 47 is the start time of the task of monitoring or working by the monitor of the entry. Working start time 47 can be used for obtaining the fatigue level of the monitor based on a continuous working time from the start time to the current time.

For example, the first entry indicates that monitor A starts monitoring task X for monitoring vehicle M1 at 19:00 and the task is being processed. The working start time of monitor A is 17:00 in the processing of the monitoring task. Hereinafter, a monitoring task with a task ID of X will be referred to as monitoring task X.

The second entry indicates that monitor B starts monitoring task Y for monitoring vehicle M2 at 20:00 and the task is being processed. The working start time of monitor B is 17:00 in the processing of the monitoring task.

Monitoring controller 17 can identify whether a monitoring task is being processed by each monitor with reference to monitor table 19A.

FIG. 5 is an explanatory diagram of task table 19B managed by task manager 19 according to the present embodiment. Task table 19B is an example of information indicating attribute information on monitoring tasks.

As indicated in FIG. 5, each entry of task table 19B includes the items of task ID 51 and priority 52.

Task ID 51 is the identifier of the monitoring task of the entry.

Priority 52 is information on the priority of the monitoring task of the entry. Priority 52 is, but is not limited to, a numeric value that increases with priority.

For example, task table 19B indicates that task X has a priority of 50 and task Y has a priority of 90.

The attribute information may include information on the difficulty of the monitoring task or an estimated time for the task.

Monitoring controller 17 obtains the priority of the monitoring task or other attribute information with reference to task table 19B and controls the allocation of the monitoring task by using the attribute information.

FIG. 6 is an explanatory diagram of proficiency table 19C managed by task manager 19 according to the present embodiment.

As indicated in FIG. 6, each entry of proficiency table 19C includes the items of monitor ID 61, proficiency 62 of task X, proficiency 63 of task Y, and proficiency 64 of task Z.

Monitor ID 61 is identification information on the monitor of the entry.

Proficiency 62 of task X is information on proficiency in task X by the monitor of the entry. For example, proficiency 62 is 0% when the monitor is not proficient at all, whereas proficiency 62 is 100% when the monitor is completely proficient. The set value increases with the proficiency. This also holds true for proficiencies 63 and 64 of tasks Y and Z.

Processing performed in monitoring system 1 configured thus will be described below.

Figure 7:
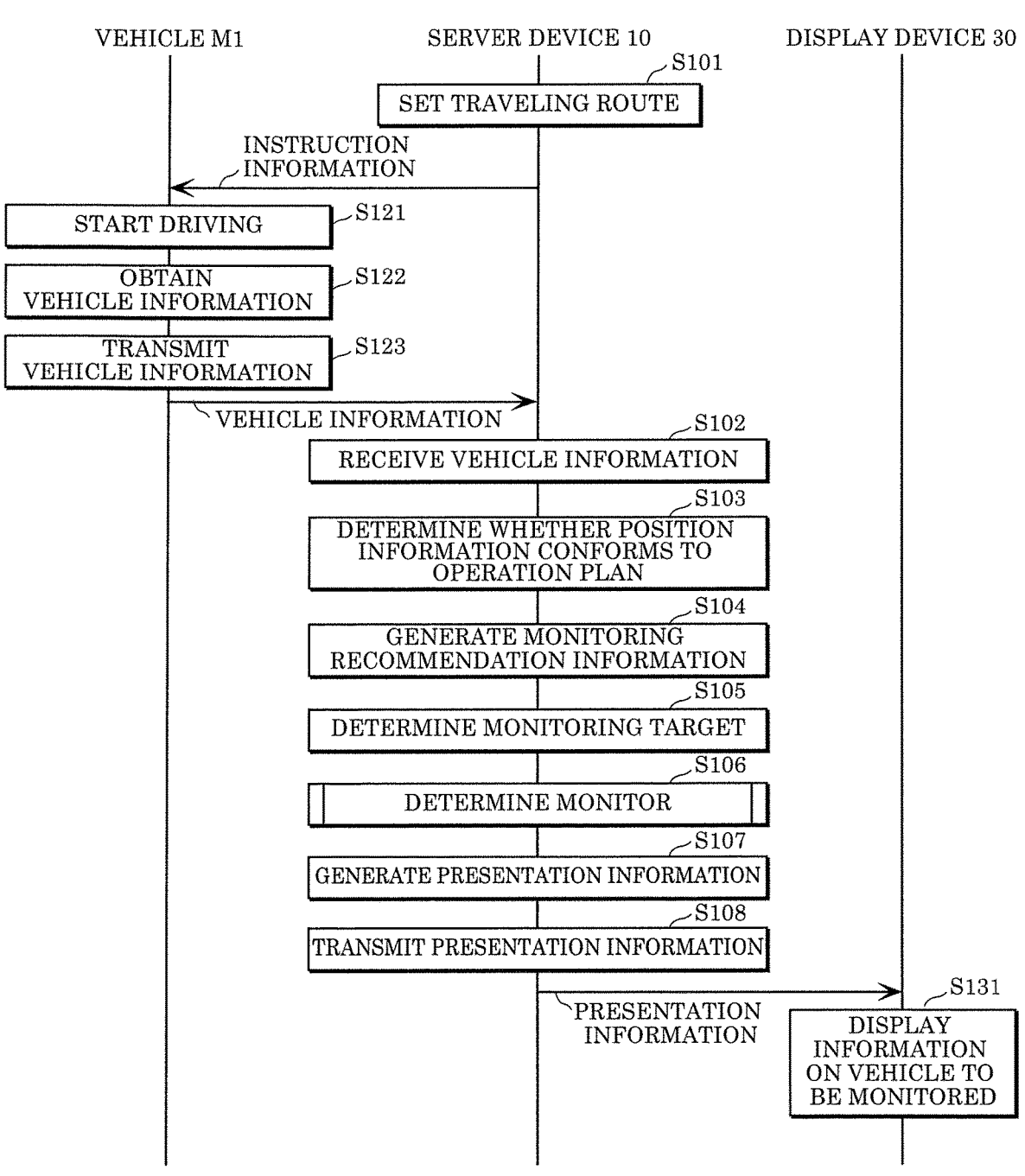
FIG. 7 is a sequence diagram of processing performed in the monitoring system according to the embodiment.

FIG. 7 is a sequence diagram of processing performed in monitoring system 1 according to the present embodiment. The sequence diagram of FIG. 7 indicates a flow of processing in which a monitoring target is determined based on, for example, vehicle information on vehicles M1 and the like and a monitor who monitors a vehicle to be monitored is determined from multiple monitors. In FIG. 7, vehicles M1 and the like are typified by vehicle M1. The same processing is also performed on other vehicles M2 to MN.

As shown in FIG. 7, in step S101, operation manager 14 of server device sets the traveling route of vehicle M1 based on the operation plan of vehicle M1 in operation DB 13. Operation manager 14 then transmits instruction information including the set traveling route to vehicle M1. Moreover, operation manager 14 sets a traveling route for each of vehicles M2 to MN and transmits instruction information to the vehicles.

In step S121, vehicle M1 receives the instruction information transmitted by operation manager 14 in step S101. Vehicle M1 travels based on the received instruction information along the traveling route set by operation manager 14.

In step S122, vehicle M1 obtains vehicle information (i.e., sensing data and image data). Specifically, vehicle M1 obtains sensing data on a position, a speed, an acceleration, or a steering angle during driving from a plurality of sensors and obtains image data from a camera.

In step S123, vehicle M1 transmits the vehicle information (i.e., sensing data and image data), which is obtained in step S122, to server device 10. Also after step S123, vehicle M1 obtains sensing data on a position, a speed, an acceleration, or a steering angle during driving and image data and transmits the data to server device 10.

Processing in steps S121 to S123 is similarly performed on other vehicles M2 to MN.

In step S102, communication unit 11 of server device 10 receives the vehicle information transmitted from vehicles M1 and the like in step S123. Communication unit 11 provides the received vehicle information for vehicle manager 12.

In step S103, operation manager 14 of server device 10 determines whether or not position information included in the vehicle information received in step S102 conforms to the operation plan, and generates operation information indicating the result of determination.

In step S104, recommendation unit 15 generates recommendation information for monitoring. Specifically, recommendation unit 15 obtains, from vehicle manager 12, the vehicle information received by communication unit 11 in step S102 and obtains the operation information generated by operation manager 14 in step S103. Moreover, recommendation unit 15 determines the vehicle recommended to be monitored based on the obtained vehicle information and operation information and provides monitoring controller 17 with recommendation information indicating the determined vehicle.

In step S105, monitoring controller 17 determines a target to be monitored by the monitor. When monitoring controller 17 determines the monitoring target, the target is determined based on the recommendation information provided by recommendation unit 15 in step S104 and the manipulation information received by receiver 16.

In step S106, monitoring controller 17 determines the monitor who monitors the vehicle determined as a monitoring target in step S105. Processing for determining the monitor by monitoring controller 17 will be specifically described later.

In step S107, video manager 18 generates presentation information that indicates that the vehicle determined as a monitoring target by monitoring controller 17 in step S105 is monitored by the monitor determined in step S106.

In step S108, video manager 18 transmits the presentation information generated in step S107 to display device 30.

In step S131, display device 30 receives the presentation information transmitted by monitoring controller 17 in step S108 and displays, based on the presentation information, information on the vehicle to be monitored and information on the monitor who monitors the vehicle.

FIG. 8 is a flowchart depicting how monitoring controller 17 determines a monitor according to the present embodiment. The flowchart of FIG. 8 specifically indicates processing included in step S106 of FIG. 7. For example, if monitoring controller 17 determines another vehicle to be monitored, the processing is performed in the determination of the monitor to be allocated with a monitoring task for monitoring the vehicle.

As indicated in FIG. 8, in step S201, monitoring controller 17 determines the presence or absence of a monitor not allocated with a monitoring task. If it is determined that a monitor not allocated with a monitoring task is present (Yes in step S201), the process advances to step S211, otherwise (No in step S201) the process advances to step S202.

In step S202, monitoring controller 17 obtains information on monitoring by the monitor allocated with the monitoring task. The information corresponds to first monitoring information.

In step S203, monitoring controller 17 obtains information on monitoring on a vehicle that is not a monitoring target, that is, a vehicle to be monitored hereafter. The information corresponds to second monitoring information.

In step S204, monitoring controller 17 compares the first monitoring information and the second monitoring information. Monitoring controller 17 then attempts to select a monitor who monitors the vehicle to be monitored, according to the comparison result. If the monitor is successfully selected, the selected monitor is allocated with monitoring on the vehicle to be monitored.

For example, monitoring controller 17 selects a monitor who performs a monitoring task having lower priority than another monitoring task or a monitor who performs a monitoring task with an attribute identical or similar to the attribute of another monitoring task.

In step S211, monitoring controller 17 allocates the monitoring task of monitoring the vehicle to be monitored, to the monitor not allocated with a monitoring task.

At the completion of step S204 or S211, the series of processing in FIG. 8 is completed.

In step S204, even in the case of a monitor allocated with a monitoring task, another monitoring task may be allocated if the task processed by the monitor is expected to be terminated in a relatively short time. The estimated time of the end of a currently processed task (estimated end time) is obtained by adding the estimated time for the task included in task table 19B to the start time of the task included in monitor table 19A.

If the monitor cannot be determined in step S204, that is, when there is no monitor to be selected in accordance with the result of comparing, monitoring controller 17 may change a state of the vehicle to be monitored to a safer state. Specifically, in the traveling of the vehicle to be monitored, the state of the vehicle is changed to a safer state by controlling the vehicle so as to move to the side of a road, decelerate, or stop.

In this case, estimated end times are obtained, each indicating an estimated time of ending the monitoring performed on the first vehicle by corresponding one of the plurality of monitors, and when there is no monitor to be selected in accordance with the result of comparing, a monitor having an earliest estimated end time (corresponding to a fourth monitor) may be selected from the plurality of monitors.

Based on the obtained vehicle information, operation information, and monitoring information, recommendation unit 15 may generate recommendation information for recommending the vehicle to be monitored in the future to the monitor. Monitoring may be required in the future for a vehicle entering an intersection where no traffic light is installed, a vehicle entering a position where self-driving frequently stops, or a vehicle entering a position where a lane is closed by an accident or a construction.

In this case, recommendation unit 15 obtains information indicating a request time when monitoring on the vehicle is to be requested, based on the vehicle information and the operation information. Based on the recommendation information generated by recommendation unit 15, monitoring controller 17 generates monitoring information indicating the vehicle to be monitored in the future, and video manager 18 generates presentation information based on the generated monitoring information and presents the information to display device 30. At this point, video manager 18 can present the presentation information before the request time, and the presentation information may further include the contents of monitoring. This can advantageously notify the monitor of the monitoring in advance.

Monitoring controller 17 may further obtain state information indicating a state of the monitor (first monitor) allocated with monitoring on the first vehicle and generate presentation information that recommends changing the first monitor to a monitor different from the first monitor in accordance with the result of comparing and the obtained state information. If the monitor continuously performs monitoring for a long time, the monitor may be placed into a mental condition such that the monitor cannot focus attention on monitoring due to fatigue or lost concentration. This may lead to insufficient or inappropriate monitoring. If it is determined that the monitor has continuously performed the monitoring task for a predetermined time (e.g., one hour or three hours), monitoring controller 17 generates the presentation information that recommends changing the monitor to a monitor different from the monitor and presents the information on display device 30 with reference to monitor table 19A and task table 19B. This allows the former monitor to rest from the monitoring task.

VARIATION OF THE EMBODIMENT

The variation will describe a configuration different from the embodiment regarding, for example, an information processing method capable of reducing a monitoring burden on a monitor.

FIG. 9 is a block diagram illustrating a configuration of information processing system 10A according to the variation. The configuration included in information processing system 10A according to the variation can be implemented by using a computer, more specifically, by running a predetermined program through a processor using memory.

As illustrated in FIG. 9, information processing system 10A includes first obtainer 71, second obtainer 72, comparator 73, generator 74, and output unit 75.

First obtainer 71 obtains a first information item regarding monitoring performed by a monitor on a first vehicle, the monitoring being allocated to the monitor. First obtainer 71 corresponds to task manager 19.

Second obtainer 72 obtains a second information item regarding monitoring performed on a second vehicle not to be monitored by the monitor. Second obtainer 72 corresponds to recommendation unit 15 and state obtainer 20.

Comparator 73 compares the first information item with the second information item. Comparator 73 corresponds to monitoring controller 17.

Generator 74 generates presentation information indicating the monitoring on the second vehicle in accordance with the result of the comparing. Generator 74 corresponds to the function of generating the presentation information in video manager 18.

Output unit 75 presents the generated presentation information via a presentation device. Output unit 75 corresponds to the function of presenting the presentation information in video manager 18.

Thus, information processing system 10A can reduce monitoring burdens on monitors.

Figure 10:
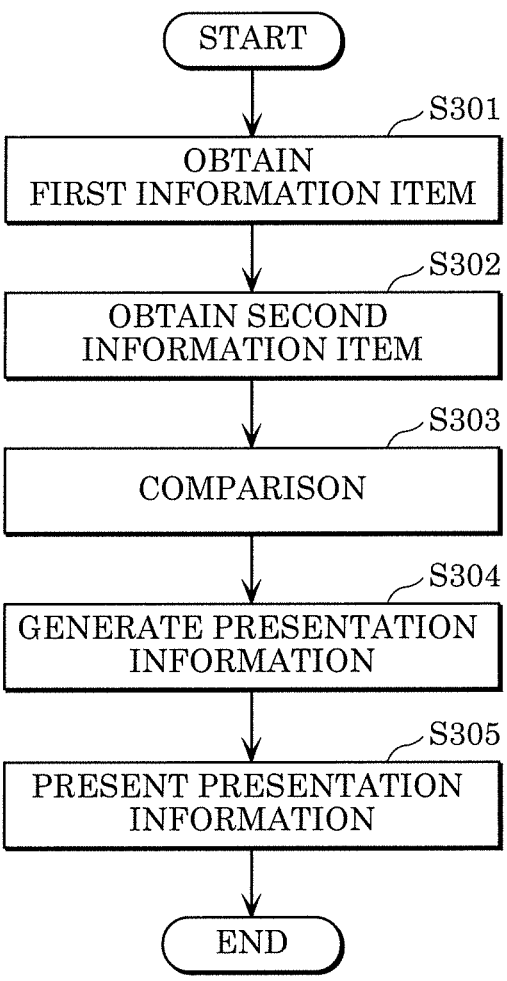
FIG. 10 is a flowchart of an information processing method according to another variation of the embodiment.

FIG. 10 is a flowchart of an information processing method according to the variation. The processing included in the information processing method according to the variation can be implemented by using a computer.

As indicated in FIG. 10, in step S301, the first information item is obtained regarding monitoring performed by the monitor on the first vehicle, the monitoring being allocated to the monitor.

In step S302, the second information item is obtained regarding monitoring performed on the second vehicle not to be monitored by the monitor.

In step S303, the first information item and the second information item are compared with each other.

In step S304, the presentation information indicating the monitoring on the second vehicle is generated in accordance with the result of the comparing.

In step S305, the generated presentation information is presented via the presentation device.

As a result, a monitoring burden on the monitor can be reduced.

As described above, the information processing methods according to the present embodiment and the variation generate the presentation information regarding monitoring on the second vehicle in accordance with a result of comparing the first information item with the second information item, and it is therefore possible to present the information regarding monitoring on the second vehicle in consideration with a relationship between the monitoring on the first vehicle which has already been performed and the monitoring on the second vehicle. Therefore, a more appropriate monitor is selected to monitor the second vehicle in comparison with the case where at least one of the monitoring on the first vehicle which has already been performed and the monitoring on the second vehicle is not considered. As a result, a monitoring burden on the monitor can be reduced.

The monitoring on the second vehicle is determined based on a comparison between the attributes of monitoring. Therefore, it is easier to design the comparing processing for determining the monitoring on the second vehicle.

The monitoring on the second vehicle is determined based on a comparison between the priorities of monitoring. Therefore, it is possible to determine which is to be monitored first between the first vehicle and the second vehicle. Hence, it is possible to allocate a monitor to a vehicle having a higher priority, and thereby reduce a monitoring burden on the monitor.

Furthermore, monitoring on the second vehicle is determined based on a comparison between the first and second vehicles regarding at least one of the priorities of the vehicles and the priorities of monitoring tasks for their monitoring. Therefore, it is possible to enhance the accuracy of the determination which is to be monitored first between the first vehicle and the second vehicle.

Monitoring on the second vehicle is determined based on a comparison between the first and second vehicles regarding at least one of the priorities of the passengers of the vehicles and whether or not the passengers are to be considered. Therefore, it is possible to enhance the accuracy of the determination which is to be monitored first between the first vehicle and the second vehicle.

Moreover, monitoring on the second vehicle is determined based on a comparison between vehicle information items each including a vehicle position, a vehicle speed, and the like. Therefore, it is possible to enhance the accuracy of the determination which is to be monitored first between the first vehicle and the second vehicle.

When a plurality of monitors are currently monitoring a plurality of vehicles, in other words, when there are a plurality of the first vehicles, it is possible to appropriately select a monitor to monitor the second vehicle from the monitors in accordance with similarities between monitoring on the first vehicles and monitoring on the second vehicle. A monitor has a less burden in monitoring a vehicle that is more similar to a previously monitored vehicle. Therefore, it is possible to reduce a monitoring burden while monitoring the vehicle to be monitored.

Monitoring on the second vehicle is determined based on how much the positions of the first and second vehicles are close to each other. As the second vehicle is closer to the first vehicle, the second vehicle has a monitoring task more similar to that of the first vehicle. Therefore, a monitor has a less change in monitoring the second vehicle after monitoring the first vehicle. As a result, it is possible to reduce a burden on the monitor monitoring the second vehicle after the first vehicle.

Furthermore, monitoring on the second vehicle is determined in accordance with at least one of the content and the difficulty of monitoring on the vehicle. As the second vehicle has a more similar content or difficulty to that of the first vehicle, the monitor has a less change in monitoring the second vehicle after monitoring the first vehicle. Therefore, it is possible to reduce a burden on the monitor.

Moreover, monitoring on the second vehicle is determined in accordance with a state of the monitor currently monitoring the first vehicle. Therefore, it is possible to allocate the second vehicle to a monitor having a less burden in monitoring the second vehicle after the first vehicle. As a result, the monitoring burden on the monitor can be more efficiently reduced.

Furthermore, changing monitors are recommended based on a state of a monitor monitoring the first vehicle. Therefore, if a monitor is in a state inappropriate for monitoring, the monitor can be changed to a different monitor. As a result, it is possible to decrease a risk of inadequate or inappropriate monitoring resulting from a monitor's state.

It is possible to more easily or more appropriately detect a state of a monitor monitoring a vehicle, based on a fatigue level, a health condition, attentiveness to a monitoring task, an allocation state of the monitoring task, and a proficiency in the monitoring task.

Moreover, it is possible to identify a monitor having a skill and experience suitable for monitoring on the second vehicle not for general vehicle monitoring, based on a proficiency required for a task for the monitoring on the second vehicle.

Furthermore, it is possible to change a state of the second vehicle to a safer state when no monitor is selected to monitor the second vehicle. Therefore, it is possible to ensure safety of the second vehicle without increasing a burden on a monitor.

When no monitor is selected to monitor the second vehicle, a monitor who is to end current monitoring earlier than any other monitors is allocated with the second vehicle. Therefore, a time period in which the second vehicle is not monitored can be decreased as much as possible, even if all monitors are currently busy in monitoring other vehicles and cannot immediately start monitoring the second vehicle.

A request for monitoring is presented to a monitor before the monitoring is actually to be performed. Therefore, prior to a time of starting the monitoring, the monitor is able to learn that the monitor is selected to perform the monitoring. As a result, for example, the monitor has a time for preparation for the monitoring, thereby reducing a burden in starting the monitoring.

Each of the elements in the above embodiment may be configured in the form of an exclusive hardware product, or may be realized by executing a software program suitable for the element. Each of the elements may be realized by means of a program executing unit, such as a Central Processing Unit (CPU) or a processor, reading and executing the software program recorded on a recording medium such as a hard disk or semiconductor memory. Such software implementing the information processing method according to the above embodiment and the like is as below.

The program causes a computer to execute an information processing method using the computer. The information processing method includes: obtaining a first information item regarding first monitoring performed by a first monitor on a first vehicle, the first monitoring being allocated to the first monitor; obtaining a second information item regarding second monitoring on a second vehicle, the second monitoring being not allocated to any monitor; comparing the first information item with the second information item; generating presentation information indicating the second monitoring on the second vehicle in accordance with a result of the comparing; and presenting the generated presentation information via a presentation device.

Although the information processing method and the like according to one or more aspects of the present disclosure have been described based on the embodiment, the present disclosure is not limited to this embodiment. Those skilled in the art will readily appreciate that embodiments arrived at by making various modifications to the above embodiment arrived at by selectively combining elements disclosed in the above embodiment without materially departing from the scope of the present disclosure may be included within one or more aspects of the present disclosure.

INDUSTRIAL APPLICABILITY

The present disclosure is applicable to an information processing method of reducing a monitoring burden on a monitor.

What is claimed is:

1. An information processing method using a computer, the information processing method comprising:
   obtaining a first information item regarding first monitoring performed by a first monitor on a first vehicle out of a plurality of vehicles, the first monitoring being allocated to the first monitor;
   obtaining a second information item regarding second monitoring on a second vehicle which is a vehicle other than the first vehicle out of the plurality of vehicles;
   comparing the first information item with the second information item; and
   presenting presentation information indicating the second monitoring on the second vehicle generated in accordance with a result of the comparing via the presentation device.

2. The information processing method according to claim 1,
   wherein the first information item includes an attribute of the first monitoring on the first vehicle, and
   the second information item includes an attribute of the second monitoring on the second vehicle.

3. The information processing method according to claim 1,
   wherein the first information item includes a first priority of the first monitoring on the first vehicle, and
   the second information item includes a second priority of the second monitoring on the second vehicle.

4. The information processing method according to claim 3,
   wherein the first priority includes at least one of (i) a priority of the first vehicle and (ii) a priority of a monitoring task for the first monitoring on the first vehicle, and
   the second priority includes at least one of (i) a priority of the second vehicle and (ii) a priority of a monitoring task for the second monitoring on the second vehicle.

5. The information processing method according to claim 3,
   wherein the first priority includes a priority based on at least one of (i) a first passenger of the first vehicle and (ii) whether or not the first passenger is to be considered, and
   the second priority includes a priority based on at least one of (i) a second passenger of the second vehicle and (ii) whether or not the second passenger is to be treated.

6. The information processing method according to claim 3, further comprising:
   obtaining first vehicle information on the first vehicle and second vehicle information on the second vehicle; and
   calculating the first priority based on the first vehicle information and calculating the second priority based on the second vehicle information.

7. The information processing method according to claim 1,
wherein the comparing includes comparing a similarity between (i) each of a plurality of first information items each being the first information item regarding a plurality of first vehicles each being the first vehicle monitored by a plurality of monitors and (ii) the second information item, and
the information processing method comprises:
selecting, from among the plurality of monitors, a second monitor to be allocated with the second monitoring on the second vehicle in accordance with the result of the comparing; and
presenting the presentation information to the second monitor selected in the selecting.

8. The information processing method according to claim 7,
wherein each of the first information items includes first position information included in the first vehicle information on a corresponding one of the plurality of first vehicles,
the second information includes second position information included in the second vehicle information on the second vehicle, and
the similarity includes a distance between (i) a position indicated in the first position information of each of the plurality of first vehicles and (ii) a position indicated in the second position information of the second vehicle.

9. The information processing method according to claim 7,
wherein each of the first information items includes at least one of a content and a difficulty of the first monitoring regarding a corresponding one of the plurality of first vehicles,
the second information item includes at least one of a content and a difficulty of the second monitoring regarding the second vehicle, and
the similarity includes a difference between (i) at least one of the content and the difficulty of the first monitoring regarding each of the plurality of first vehicles and (ii) at least one of the content and the difficulty of the second monitoring regarding the second vehicle.

10. The information processing method according to claim 1, further comprising:
obtaining state information items each indicating a state of a corresponding one of a plurality of monitors;
selecting, from among the plurality of monitors, a third monitor to be allocated with the second monitoring on the second vehicle in accordance with the result of the comparing and the obtained state information items; and
presenting the presentation information and the third monitor selected in the selecting.

11. The information processing method according to claim 10,
wherein the state information item includes an information item indicating at least one of: a fatigue level; a health condition; attentiveness to a monitoring task; an allocation state of the monitoring task; and a proficiency in the monitoring task.

12. The information processing method according to claim 11,
wherein the proficiency includes a proficiency required for a task for the second monitoring on the second vehicle.

13. The information processing method according to claim 1, further comprising:

obtaining a state information item indicating a state of the first monitor; and
generating the presentation information that recommends changing the first monitor to a monitor different from the first monitor in accordance with the result of the comparing and the state information item obtained in the obtaining.

14. The information processing method according to claim 1, further comprising:
attempting to select, from a plurality of monitors, a fourth monitor to be recommended for the second monitoring on the second vehicle in accordance with the result of the comparing; and
when there is no the fourth monitor to be selected in accordance with the result of the comparing, changing a state of the second vehicle in the comparing to a safer state via a controller controlling the second vehicle.

15. The information processing method according to claim 1, further comprising:
attempting to select, from a plurality of monitors, a fourth monitor to be recommended for the second monitoring on the second vehicle in accordance with the result of the comparing;
obtaining estimated end times each indicating an estimated time of ending the first monitoring performed by a corresponding one of the plurality of monitors; and
when there is no the fourth monitor to be selected in accordance with the result of the comparing, selecting a monitor having an earliest estimated end time among the estimated end times as the fourth monitor from the plurality of monitors.

16. The information processing method according to claim 1, further comprising:
obtaining an information item indicating a request time when the second monitoring on the second vehicle is to be requested; and
presenting the presentation information before the request time.

17. An information processing method using a computer, the information processing method comprising:
obtaining a first information item regarding first monitoring performed by a first monitor on a first vehicle, the first monitoring being allocated to the first monitor;
obtaining a second information item regarding second monitoring on a second vehicle which is not monitored by a monitor;
comparing the first information item with the second information item; and
presenting presentation information indicating the second monitoring on the second vehicle generated in accordance with a result of the comparing via the presentation device.

18. An information processing method using a computer, the information processing method comprising:
obtaining a first information item regarding first monitoring performed by a first monitor on a first vehicle, the first monitoring being allocated to the first monitor;
obtaining a second information item regarding second monitoring on a second vehicle which is a candidate to be monitored by a monitor;
comparing the first information item with the second information item; and
presenting presentation information indicating the second monitoring on the second vehicle generated in accordance with a result of the comparing via the presentation device.

* * * * *